Jan. 10, 1956 N. S. HODSKA 2,730,397
TOAST SERVERS
Filed Jan. 13, 1953
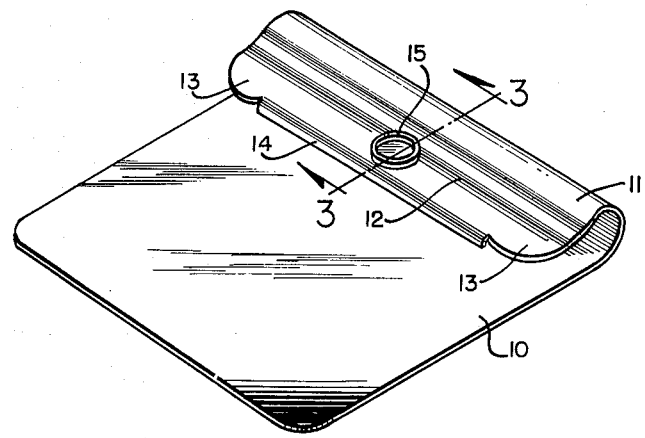
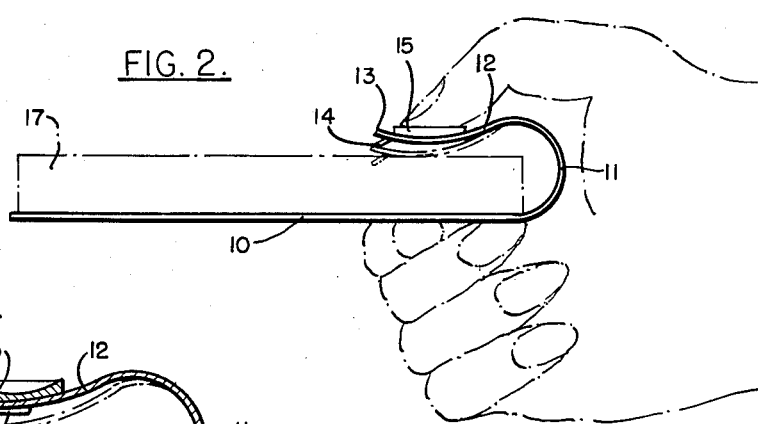
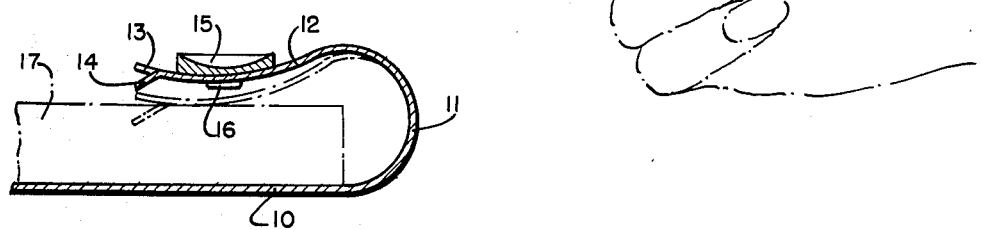
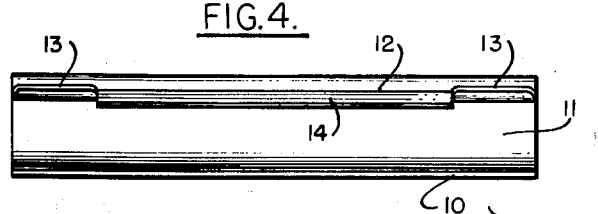
INVENTOR
Nicholas S. Hodska United States Patent Office 2,730,397
Patented Jan. 10, 1956

2,730,397
TOAST SERVERS

Nicholas S. Hodska, Stratford, Conn., assignor to F. D. Kees Manufacturing Company, Beatrice, Nebr.

Application January 13, 1953, Serial No. 330,959

1 Claim. (Cl. 294—25)

The present invention relates to a toast server and it consists in the combinations, constructions and arrangements of parts herein described and claimed.

Generally the invention comprises a simple device having a rectangular body one end of which is integrally connected with a curvular hand grip and to the other end of the hand grip there is integrally connected a flexible gripping portion having a dependent gripping finger and a pair of outwardly extending guide members each formed at one side of the gripping finger. The device is such that it may be easily slipped into one of the conventional openings in a toaster to encompass a portion of a piece of toast which may then be gripped by compressing the gripping portion of the device and removed from the toaster and, while so held, may be buttered as desired. The device is also useful or serving toast without the necessity of touching the same with the fingers during such serving operation.

It is accordingly an object of the invention to provide a device of the character set forth which is simple in construction, inexpensive to manufacture and yet effective and efficient in use.

Another object of the invention is to provide a device of the character set forth having means for gripping and holding a piece of toast whereby the same may be buttered and/or served without the necessity for touching the same by the hands of the operator.

Another object of the invention is to provide a device of the character set forth which may be formed of a single piece of sheet material.

Other and further objects of the invention will become apparent from a reading of the following specification taken in conjunction with the drawing, in which:

Figure 1 is a perspective view of an embodiment of the invention,

Figure 2 is a side elevational view thereof,

Figure 3 is an enlarged fragmentary sectional view taken along line 3—3 of Figure 1, and Figure 4 is an end elevational view of the device illustrated in Figures 1 and 2.

Referring more particularly to the drawing, there is shown therein a toast server comprising an oblong body 10 of sheet material which may be metal or plastic to one end of which is integrally connected a substantially U-shaped hand grip portion 11 having integrally connected therewith a gripping portion 12 which extends substantially parallel to the body 10 and approximately one-third of the width of such body.

The free end of the gripping portion 12 is provided with integrally formed out-turned guide members 13 adjacent each end thereof and centrally, between the members 13, with an integrally formed downturned gripping member 14. A thumb-receiving button 15 may be affixed, as by a rivet 16 or the like centrally upon the gripping portion 12 adjacent the free end thereof or, alternatively, the button 15 may be omitted and the gripping portion 12 merely marked at that point with indicia such as "Press Here."

In operation, it will be apparent that the device may be utilized with a conventional toaster in such manner that when a piece of toast is ready for removal from such toaster, the body 10 may be inserted into the conventional toast receiving opening of the toaster to thus encompass one side of such piece of toast such as is indicated in dotted lines at 17 in Figures 2 and 3, whereupon the gripping portion 12 will encompass the other side of such toast 17. Thereupon the user may press his thumb upon the button 15 to thereby cause the gripping finger 14 to frictionally engage the toast 17 whereupon the toast may be removed from the toaster and immediately served or may first be buttered while holding the same in the present device after which it may be served. It will be apparent that the device will prevent the user from scorching his hands and at the same time allow the service of the toast without the touching of the same by the person so serving it.

While but one form of the invention has been shown and described herein, it will be readily apparent to those skilled in the art that many minor modifications may be made without departing from the spirit of the invention or the scope of the appended claim.

What is claimed is:

A toast server comprising a rectangular flat body of resilient material of substantially the same size as a piece of toast, said body being adapted to pass downwardly within the opening of a toaster, a U-shaped hand grip integrally formed at one end of said body, a bendable gripping portion integrally formed along the free edge of said hand grip, said gripping portion extending substantially parallel to said body for approximately one-third the length of said body, the central portion of said gripping portion along the free edge thereof being bent downwardly whereby to provide an inwardly extending gripping finger adapted to engage the adjacent face of the toast, an out-turned substantially flat toast contacting ear integrally formed with each end portion of the free edge of said gripping portion and a thumb receiving button secured to the upper surface of said gripping portion.

References Cited in the file of this patent

UNITED STATES PATENTS

| | | |
|---|---|---|
| 567,087 | Fitzgerald et al. | Sept. 1, 1896 |
| 1,538,808 | Hedeen | May 19, 1925 |
| 2,207,286 | Cohen | July 9, 1940 |